United States Patent [19]

Hatch et al.

[11] Patent Number: 5,817,735
[45] Date of Patent: Oct. 6, 1998

[54] WATER-BASED PRIMERS WITH A LOW VOLATILE ORGANIC CONTENT

[75] Inventors: Ellis Hatch, Middlesex Township, Butler County; Brian Zanotti, Hyde Park Boro, both of Pa.

[73] Assignee: PPG Industries, Inc., Pittsburgh, Pa.

[21] Appl. No.: 597,632

[22] Filed: Feb. 7, 1996

[51] Int. Cl.⁶ ........................................... C08G 18/34
[52] U.S. Cl. ........................... 528/84; 273/235; 524/460; 525/440; 528/85
[58] Field of Search ..................... 528/84, 45; 525/440; 524/460; 273/235

[56] References Cited

PUBLICATIONS

Cydrothane® Polyurethane Dispersions, CYTEC Urethane Chemicals Department, West Patterson, NJ 07424, pp. 2–21.
New and Improved Waterborne Polyurethanes From The TMXDI® (META) Aliphatic Isocyanate Family, Robert D. Cody and Victoria S. Askew, Urethane Chemicals & Elestomers Dept., American Cyanamid Company, Bridgewater NJ 08807.

*Primary Examiner*—Terressa Mosley
*Attorney, Agent, or Firm*—Paul S. Chirgott

[57] ABSTRACT

The present invention pertains to a primer composition having a volatile organic content (V.O.C.) less than about 1.5. A pigmented or clear topcoat may be applied over this primer composition. The primer composition includes a substantially solvent-free urethane dispersion and a substantially solvent-free acrylic. The solvent-free urethane component and the solvent-free acrylic component could contain as much as 15 weight percent of a solvent as long as the combined solvent content of these two components is such that the V.O.C. of the resulting primer is less than about 1.5. The amount of the solvent-free urethane component present in the low V.O.C. primer prepared in accordance with the present invention ranges from between about 10 to about 90 weight percent, while the amount of the solvent-free acrylic component ranges from between about 90 to about 10 weight percent. The solvent-free urethane component has a tensile strength which ranges from between about 4,000 to about 9,000 psi. and a glass transition temperature ($T_g$) ranging from between about 20° C. to about 50° C. The solvent-free acrylic component, which has a $T_g$ in the range from between about 10° C. to about 90° C., can be either or made in water or in a solvent and thereafter dispersed in water.

20 Claims, No Drawings

WATER-BASED PRIMERS WITH A LOW VOLATILE ORGANIC CONTENT

FIELD OF THE INVENTION

The present invention pertains to the field of water-based primers. In particular, the invention is directed to primers which contain a low level of volatile organic content. The primers of this invention are particularly useful for application onto golf balls.

BACKGROUND OF THE INVENTION

Many of today's golf balls include at least a core and a cover. The core may be wound, or it may be compression molded from a slug of uncured or lightly cured elastomer composition comprising a high cis content polybutadiene and a metal salt of a, β, ethylenically unsaturated carboxylic acid such as zinc mono or diacrylate or methacrylate. The molded cores may include metal oxides such as zinc oxide to improve the coefficient of restitution or to increase the core weight. Other materials used in the core composition include compatible rubbers or ionomers, and low molecular weight fatty acids such as stearic acid. Free radical initiator catalysts such as peroxides are admixed with the core composition so that on the application of heat and pressure, a complex curing or crosslinking reaction takes place. Wound cores are generally produced by winding a very large elastic thread around a solid or liquid filled balloon center.

Molded golf ball covers generally include in their compositions ionomeric resins such as those sold by E. I. Du Pont de Nemours & Company under the trademark "Surlyn®" and more recently, by the Exxon Corporation (see, U.S. Pat. No. 4,911,451) under the trademark "ESCOR®" or the tradename "Totek". These resins have become materials of choice for the construction of golf ball covers over the traditional "balata" (trans polyisoprene, natural or synthetic) rubbers.

Materials typically used in forming covers of golf balls are not white in appearance. For both aesthetic and functional reasons, the marketplace often demands golf balls which have a bright, white exterior. As such, golf balls are typically finished by having applied thereto at least one finishing coat.

More than five hundred million golf balls are produced each year. Of this number, a significant percentage have finishing coats applied thereto. For example, there is often a primer coat and/or top coat applied over the golf ball's cover. Either or both of these coats may be pigmented or clear. Moreover, several layers of clear or pigmented coatings may be applied. The clear coatings are typically applied to golf balls so as to provide a glossy finish to the ball and to protect any trademark or other indicia which may be stamped or painted onto the ball.

Collectively, surface coating operations using paints containing hydrocarbon solvents may well be the largest industrial source of volatile organic compounds and hazardous air pollutants. C. M. Smith and W. E. Brown, *Journal of the Air & Waste Management Association*, 1993, 43, 1015–1019. Therefore, rules and regulations have been established to limit V.O.C.'s in various industries.

The term "V.O.C." as used herein is defined as pounds of volatile organic compounds per gallon, minus the volume of water. The level of V.O.C. (i.e., volatile organic content) is basically the measure of volatile organic solvents and/or amines for a particular volume of the composition. The presence of amines will contribute to composition's V.O.C.

Many of the prior art primers used on golf balls have a high V.O.C. (i.e., a V.O.C. of at least about 2.0). There is, thus, a continuing need in the coating industry for compositions with a low V.O.C. which can be used for painting such balls without adversely affecting properties such as gloss and durability.

DESCRIPTION OF THE PRIOR ART

U.S. Pat. No. 5,409,233 (1995) discloses clear coating compositions for golf balls. In addition to comprising up to 65% by weight of a solvent system including methylamyl ketone, the clear coating composition disclosed therein comprises about 35–90% by weight of a polymer including a hydroxyl-containing resin and an isocyanate such that the equivalent weight ratio of —NCO to —OH is in the range of 0.9 to 1.4.

U.S. Pat. No. 5,000,458 (1991) discloses the use of a transparent primer coat, comprising optical brighteners.

U.S. Pat. No. 5,300,325 (1994) discloses the use of 4% to 10% of a polyfunctional aziridine in the primer to promote adhesion between the cover and top coat of a golf ball. Although the use of optical brighteners is not explicitly taught, the use of aziridine derivatives would affect the UV absorption.

U.S. Pat. No. 5,334,673 (1994) discloses optical brighteners in covers made from polyurethane prepolymers and a slow-reacting polyamine curing agent and/or a difunctional glycol.

SUMMARY OF THE INVENTION

The improvement herein resides generally in the formulation of a low V.O.C. primer overwhich a pigmented or clear topcoat may be applied. As used herein, the term "low V.O.C. primer" refers to a primer which has a V.O.C. of less than about 1.5.

To prepare the primer of the invention, a substantially solvent-free urethane dispersion and a substantially solvent-free acrylic resin are combined and formulated into a coating composition. The solvent-free urethane component and the solvent-free acrylic component could contain as much as 15 weight percent of a solvent as long as the combined solvent content of these two components is such that the V.O.C. of the resulting waterborne primer is less than about 1.5. The amount of the solvent-free urethane component present in the low V.O.C. primer prepared in accordance with the present invention ranges from between about 10 to about 90 weight percent, while the amount of the solvent-free acrylic component ranges from between about 90 to about 10 weight percent.

The solvent-free urethane component employed when practicing this invention typically has a tensile strength which ranges from between about 4,000 to about 9,000 psi. Moreover, the glass transition temperature ($T_g$) the solvent-free urethane component typically ranges from between about 20° C. to about 50° C.

On the other hand, the solvent-free acrylic component employed when practicing this invention can be either made in water or in a solvent and thereafter dispersed in water. Regardless of how the waterborne acrylic resin is made, it typically has a $T_g$ in the range from between about 10° C. to about 90° C.

The reduction of solvents from primer coating compositions allows the formulator to control the level of solvent. Moreover, elimination of solvents such as n-methyl pyrrolidone, a common solvent found in many prior art primer compositions, has the added advantage of providing a much faster cure since n-methyl pyrrolidone is a slow evaporating solvent.

These and other aspects and advantages of this invention will become apparent to those skilled in the art upon reading the following Detailed Description.

DETAILED DESCRIPTION OF THE INVENTION

The invention pertains to a low V.O.C. waterborne primer. To prepare the primer of the invention, a substantially solvent-free urethane dispersion and a substantially solvent-free acrylic resin are combined and formulated into a coating composition.

The solvent-free urethane component and the solvent-free acrylic component employed when practicing this invention could contain as much as 15 weight percent of a solvent. Typically, the solvent-free urethane component and the solvent-free acrylic component employed contain less than about 10 weight percent of a solvent, preferably, less than about 5 weight percent, and more preferably less than about 2 weight percent. Notwithstanding the above, the combined solvent content of the solvent-free urethane component and solvent-free acrylic component employed when practicing this invention should be such that the V.O.C. of the resulting primer composition is less than about 1.5, preferably less than about 1.3, and more preferably less than about 1.1.

The solvent-free urethane component employed when practicing this invention typically has a tensile strength which ranges from between about 4,000 to about 9,000 psi. Preferably, the tensile strength of the urethane component ranges from between about 5,000 to about 8,000 psi., and more preferably from between about 6,000 to about 7,000 psi. Moreover, the glass transition temperature ($T_g$) the solvent-free urethane component typically ranges from between about 20° C. to about 50° C. Preferably, the $T_g$ of the urethane component ranges from between about 25° C. to about 45° C., and more preferably from between about 30° C. to about 40° C. One example of a urethane dispersion which can be used when practicing this invention is a trimethylxylene diisocyanate (TMXDI) polyester polymer such as that commercially available from Cytec Industries, Inc. of West Peterson, N.J., under the product name CYDROTHANE® HP-1035 Polyurethane Dispersion.

The solvent-free acrylic component employed when practicing this invention can be either made in water or in a solvent and thereafter dispersed in water. Regardless of how the waterborne acrylic resin is made, it typically has a $T_g$ in the range from between about 10° C. to about 90° C., preferably about between about 15° C. to about 70° C., and more preferably from between about 20° C. to about 50° C.

If the acrylic resin component employed when practicing this invention is made in a solvent or a solvent/water mixture, a sufficient amount of the solvent should be driven off prior to dispersing it in water. The amount of solvent to be driven off depends, in part on the solvent content of the urethane component, the solvent content in the primer composition necessary to facilitate spraying and/or promote coalescence, and the desired V.O.C. of the resulting primer composition. To be within the scope of this invention, the V.O.C. of the resulting primer composition is to be less than about 1.5.

Any suitable acrylic resin which has a $T_g$ falling into the aforementioned range can be employed when practicing this invention. For example, the aqueous dispersion of acrylic polymer fine particles used when practicing this invention can be those known per se, described in, for example, said U.S. 4,900,774 and 4,539,363. An example of such an aqueous dispersion is an aqueous dispersion of acrylic polymer fine particles formed by polymerizing at least one acrylic monomer and, if required, another copolymerizable monomer in the presence of a nonionic surface active agent such as polyoxyethylenenonylphenyl ether, an anionic surface active agent such as polyoxyethylenealkylallyl ether sulfuric acid ester, and a dispersion stabilizer such as a water-soluble resin having an acid value of about 20 to 150 and a number average molecular weight of about 5,000 to 30,000, for example, an acrylic resin, said particle having an average particle size of usually about 0.02 to about 1 micrometer, especially 0.03 to 0.5 micrometer.

Examples of the acrylic monomer subjected to polymerization are (meth)acrylic acid; carboxyalkyl (meth)acrylates such as 2-carboxyethyl (meth)acrylate;

alkyl (meth)acrylates such as methyl (meth)acrylate, ethyl (meth)acrylate, propyl (meth)acrylate, propyl (meth) acrylate, n-butyl(meth)acrylate, isobutyl (meth)acrylate and 2-ethylhexyl (meth)acrylate; hydroxyalkyl (meth)acrylates such as hydroxyethyl (meth)acrylate, hydroxypropyl (meth) acrylate and hydroxybutyl (meth)acrylate;

(meth)acrylamides such as (meth)acrylainide, N-propoxymethyl (meth)acrylamide and N-butoxymethyl (meth)acrylamide; and glycidyl (meth)acrylate. They are used either singly or in combination. Examples of the other monomer copolymerizable with the acrylic monomer are alpha beta-ethylenically unsaturated carboxylic acids such as maleic acid, funaric acid, itaconic acid and a half ester of maleic acid or fumaric acid, vinyl aromatic compounds such as styrene, vinyl toluene and alpha-methylstyrene, vinyl acetate, and (meth)acrylonitrile.

Moreover, a polyfunctional monomer can be used in a small amount, if required, to crosslink the formed polymer fine particles. Examples of the polyfunctional monomer .re divinylbenzene, ethylene glycol di(meth)acrylate, 1,6-hexane di(meth)acrylate, trimethylolpropane di(meth) acrylate, ally(meth)acrylate, and triacrylic acid trimethylol-propane.

As the aqueous dispersion of acrylic polymer fine particles used in this invention, an aqueous dispersion prepared by a multistage polymerization method is also available. For example, a multistage polymerization emulsion formed by first emulsion-polymerizing the above acrylic monomer not containing or containing a small amount of an alpha beta-ethylenically unsaturated acid, and then copolymerizing an acrylic monomer containing a large amount of an alpha beta-ethylenically unsaturated acid is thickened by neutralization with a neutralizing agent, and is therefore desirable from the aspect of coatability. Examples of the neutralizing agent are ammonia and water-soluble amino compounds such as monoethanolamine, ethylamine, dimethylamine, diethylamine, triethylamine, propylamine, dipropylamine, isopropylamine, diisopropylamine, triethanolamine, butylamine, dibutylamine, 2-ethylhexylamine, ethylenediamine, propylenediamine, ethylethanolamine, dimethylethanolamine, diethylethanolamine, 2-amino-2-methylpropanol, and morpholine. Of these, triethylamine, dimethylethanolamine and 2-amino-2-methylpropanol are especially preferable.

In the aqueous dispersion of acrylic polymer fine particles used in this invention, dispersed particles may be crosslinked when stress is laid upon properties such as mechanically stability, storage stability, etc. The crosslinking method can be a method known as per se in which a polyfunctional monomer such as divinylbenzene or a monomer comprising a combination of (meth)acrylic acid and glycidyl (meth)acrylate is contained in a monomer component that forms particles.

Moreover, the acrylic polymer fine particles are themselves required to have good finish appearance, excellent water resistance, etc. of the coated film. Good finish appearance can be achieved by using a relatively large amount of unsaturated acid monomer such as (meth)acrylic acid. Moreover, the use of a long-chain alkyl ester of (meth) acrylic acid is useful to improve water resistance The amount of the solvent-free urethane component present in the low V.O.C. primer prepared in accordance with the present invention typically ranges from between about 10 to about 90 weight percent, while the amount of the solvent-free acrylic component ranges from between about 90 to about 10 weight percent. Preferably, the amount of the solvent-free urethane component ranges from between about 20 to about 80 weight percent, while the amount of the solvent-free acrylic component ranges from between about 80 to about 20 weight percent. More preferably, the amount of the solvent-free urethane component ranges from between about 30 to about 70 weight percent, while the amount of the solvent-free acrylic component ranges from between about 70 to about 30 weight percent. Even more preferably, the amount of the solvent-free urethane component ranges from between about 40 to about 60 weight percent, while the amount of the solvent-free acrylic component ranges from between about 60 to about 40 weight percent.

In instances where the ratio of the urethane component to the acrylic component ranges from between about 10:90 to about 30:70, it may be necessary to add additional solvent to the primer composition to promote coalescence. The amount of additional solvent which may be necessary will depend upon the amount of solvent, if any, present in the urethane component and the acrylic component. Notwithstanding the above, the amount of additional solvent added, if any, should be such that the V.O.C. of the resulting primer composition is less than about 1.5, preferably less than about 1.3, and more preferably less than about 1.1.

If additional solvent is added to the primer composition, any solvent can be employed which is compatible with the urethane and acrylic components of the primer composition. One example of a particularly useful solvent which can be employed is 2-(2-butoxy ethoxy) ethanol commercially available from Union Carbide under the product name BUTYL CARBITOL®.

The incorporation of "reactive diluents" may also be utilized to improve flow of the primer composition. Such diluents include low molecular weight compositions with some type of a functional group(s) on the polymer chain and act to lower the viscosity of the primer and are then polymerized into the coating as it cures. These materials, however, may increase the cross link density of the primer to the extent that the primer becomes too brittle for use on golf balls. Notwithstanding the above, upon reading the disclosure herein, one skilled in the art would be able to select such reactive diluents which best suits his/her needs.

Leveling additives may also be added to reduce the surface tension of the coating for improved flow. Examples of leveling additives which can be used when practicing this invention include: FLUORAD FC-430 fluorochemical surfactant commercially available from 3M Industrial Chemical Products Div., St. Paul, Minn. and 57 ADDITIVE silicone additive commercially available from Dow Corning Corp., Midland, Mich. Other additives which can be included into the primer composition prepared in accordance with the present invention include: hindered amine U.V. stabilizers, hindered amine light stabilizers, U.V. absorbers, U.V. stabilizers, optical brighteners and de-foaming agents.

In addition to the above, the primer composition may have pigments incorporated therein. In many instances, the pigments of choice added to the primer composition are those which will impart a white or whiter color to the golf ball. Examples of such pigments include: titanium dioxide, BLANC FIX (i.e., barium sulfate), zinc oxide, LITHOPONE (i.e., a mixture of zinc oxide and barium sulfate), and magnesium silicate.

The primer composition prepared in accordance with the present invention can be applied over a number of different substrates. Typically, the primer is applied over substrates which are fairly rigid (i.e., a flexural modulus of between about 5,000 to about 100,000). An ionomer substrate provides for a desirable surface, although balata, synthetic balata, polyethylene, polypropylene and polyurethane also provide good surfaces.

The primer may be applied directly to the substrate. However, in some instances, a pretreatment to the surface, or an additional additive to the primer, may be necessary. For example, in some instances where the substrate overwhich the primer is applied is an ionomeric resin (e.g., Surlyn®), it is preferred to use an adhesion promoter. However, in other instances, such as those where the substrate overwhich the primer is applied is balata, a polyurethane or a polyolefin, adhesion promoters are typically not required.

Notwithstanding the above, if employed, the adhesion promoter is generally present in an amount ranging from between about 0.5 to about 20 weight percent, preferably, from between about 1 to about 15 weight percent, and more preferably from between about 1.5 to about 10 weight percent. One example of a particularly useful adhesion promoter which can be used when practicing this invention is the polyfunctional aziridine crosslinker commercially available from ZENECA Resins of Wilmington, Mass., under the product name of CROSSLINKER CX-100.

Any suitable application means can be employed to apply the primer to the substrate. Examples of application techniques include dipping, spraying and brushing. If the primer is applied over a golf ball, the application means of choice is spraying.

Typically, one or more layers of a top coat is applied over the primer. The primer acts as a tie coat between the substrate and the top coat. Any suitable top coat can be applied over the primer prepared in accordance with the present invention. Suitable top coats include clear and pigmented urethane coating compositions. Moreover, urethane coating compositions which are especially useful when the primer composition is applied over a golf ball include two-part urethane compositions which essentially comprise a polyol and an isocyanate. One specific example of such a urethane top coat is disclosed in U.S. Pat. No. 5,409,233.

Another example of a urethane coating composition which is especially useful when the primer composition is applied over a golf ball is one which includes a polyol component, an isocyanate component and a hydroxy functional, polyether-modified polysiloxane copolymer component. The polysiloxane copolymer component employed in this particular topcoat composition typically has a molecular weight ranging from between about 1,000 to about 10,000; and is typically present in an amount ranging from between about 0.001 to about 10 weight percent.

In this particular topcoat composition, the polyol component and the isocyanate component are typically mixed together at an isocyanate index ranging from between about 1.0 to about 2.0. Preferably, the isocyanate index of such a topcoat ranges from between about 1.3 to about 1.9, more preferably from between about 1.5 to about 1.8. As used herein, the term "isocyanate index" refers to the equivalent weight (i.e., a ratio of the molecular weight of the polymer to one functional group) ratio of the—NCO molecule to the —OH molecule.

In order to determine the appropriate amount of isocyanate to incorporate into this particular topcoat composition, the following equation can be used:

$$\text{Weight of isocyanate for crosslinking} = (\text{—NCO eq. wt.})(\text{iso. index})(\text{parts of polyol}/\text{—OH eq. wt.})$$

For example, it is known that BAYER's Desmophen A 160 has an equivalent weight of to 1058. Moreover, BAYER's Mondur CB-75 isocyanate has an equivalent weight of 323. Using the above equation, if the isocyanate index is to be 1.7, the weight of the isocyanate is 51.9.

With regard to the polyols which can be used when preparing this particular topcoat composition, they can include any material that contains a reactive hydrogen atom and that would react with the isocyanate or isocyanurate group. These materials include hydroxyl functional acrylics, hydroxyl functional polyesters, hydroxy functional polyethers, polyamines, polyamides, short oil alkyds, caster oil, epoxy resins with secondary hydroxyl groups, phenolic resins, and hydroxyl functional vinyl resins. If necessary, the vinyl resins may be used to promote adhesion.

With regard to the isocyanates which can be used when preparing this particular topcoat composition, they can be divided into four different categories. The four types include diphenylmethane 4,4'-diisocyanate (MDI), toluene diisocyanate (TDI), Isophrone diisocyanate (IPDI), and hexamethylene diisocyanate (HDI).

Polyisocyanates based on HDI represent a significant category of polyisocyanates used in polyurethane coatings. Specifically, those coatings which are prepared using HDI-based products typically show additional resistance to chemicals and abrasion. They also tend to exhibit desirable weathering characteristics, including retention of gloss, and resistance to yellowing and chalking.

BAYER's Desmodur N-75, Desmodur N-100, and Desmodur N-3200 are examples of commercially known polyisocyanates which are based on HDI. They are polymeric materials which contain biuret groups. The HDI may be converted into a trimer containing an isocyanurate ring. Such product are commercially available from BAYER under the product names Desmodur N-3300 and Desmodur N-3390.

The solvent or solvent system of this particular topcoat composition can include any suitable solvent. Examples of suitable solvents include methyl isobutyl ketone (MIBK), methyl isoamyl ketone (MIAK), methylamyl ketone (MAK), methylether propylene glycol acetate, and the like, and combinations thereof The polysiloxane copolymer component of this particular topcoat composition is hydroxy functional and has a molecular weight ranging from between about 1,000 to about 10,000. Preferably, the molecular weight of the polysiloxane copolymer component ranges from between about 3,000 to about 9,000, and more preferably, from between about 5,000 to about 8,000.

The polysiloxane copolymer component comprises a linear or branched polysiloxane which is modified by polyether groups attached at its ends through silicon-carbon bonds or silicone-oxygen-carbon bonds. Typically, there is a balance of ethylene oxide and propylene oxide-based polyethers attached to the polysiloxane such that the polysiloxane copolymer component is dispersible in both water and solvent.

Any suitable polyether-modified polysiloxane copolymer can be used as the polysiloxane copolymer component when preparing this particular topcoat composition. Examples of such suitable polyether modified polysiloxane copolymers include those commercially available from Goldschmidt Chemical Corp. of Hopewell, Va. under the product name TEGO®Glide 440 polyether-modified polysiloxane, TEGO® Glide 410 polyether-modified polysiloxane and TEGO® Glide 425 polyether-modified polysiloxane.

As with the primer compositions prepared in accordance with the present invention, the incorporation of "reactive diluents" may also be utilized to improve flow of such topcoat compositions. Such diluents include low molecular weight compositions with some type of a functional group(s) on the polymer chain and act to lower the viscosity of the primer and are then polymerized into the coating as it cures. These materials, however, may increase the cross link density of the topcoat to the extent that the topcoat becomes too brittle for use on golf balls. Notwithstanding the above, upon reading the disclosure herein, one skilled in the art would be able to select such reactive diluents which best suits his/her needs.

Leveling additives may also be added to reduce the surface tension of the coating for improved flow. Examples of leveling additives which can be used include: FLUORAD FC-430 fluorochemical surfactant commercially available from 3M Industrial Chemical Products Div., St. Paul, Minn. and 57 ADDITIVE silicone additive commercially available from Dow Corning Corp., Midland, Mich. Other additives which can be included into the topcoat composition include: hindered amine U.V. stabilizers, hindered amine light stabilizers, U.V. absorbers, U.V. stabilizers, optical brighteners and de-foaming agents.

In addition to the above, the topcoat composition may have pigments incorporated therein. In many instances, the pigments of choice added to the primer composition are those which will impart a white or whiter color to the golf ball. Examples of such pigments include: titanium dioxide, BLANC FIX (i.e., barium sulfate), zinc oxide, LITHOPONE (i.e., a mixture of zinc oxide and barium sulfate), and magnesium silicate.

The adhesion of the coating to the golf ball and the coating's durability is tested through the use of the following "hit test" and "tumble test."

In the "hit test," a standard indoor hitting machine, as known to one of ordinary skill in the art, is employed with catch nets, catch bins and return gutters. The arm of the pendulum impacts the ball at approximately 90 miles per hour.

The "tumble test" is designed to gauge abrasion/scuff resistance and to replicate the wear and abrasion characteristics of golf balls supplied for use on driving ranges ("range balls"). This test employs a 2-gallon porcelain and jar mill manufactured by Norton. The abrasion agents are E252 Alundum (granule size SM8) and small marble chips. An aluminum scoop is used to measure the amounts of abrasion agents, with 1 scoop of Alundum weighing about 1.78 pounds and 1 scoop of small marble chips weighing about 1.71 pounds.

Initially, 2 scoops of Alundum chips and 2 scoops of marble chips are placed in the jar. Then, 24 golf balls are placed in the jar, followed by 2 more scoops of Alundum and 2 more scoops of marble chips. The jar mill is turned on and allowed to run for approximately 3 hours. The balls are then removed, rinsed with water, brushed with a Nessler tube brush, and dried with towels.

The examples which follow are intended to assist in a further understanding of this invention. Particular materials employed, species and conditions are intended to be illustrative of the invention.

EXAMPLES

The examples which follow show the preparation of topcoat compositions encompassed by the present invention, the application of topcoat compositions over golf balls, the application of top coats over the primer compositions, and the adhesion and durability testing of various primer/top coat systems.

Example I

In this example, a substantially solvent-free acrylic latex formulation of about 40% solids was prepared. The solids comprised about 40 weight percent methyl methacrylate, about 33 weight percent 2-ethylhexyl acrylate, about 25 weight percent styrene and about 2 weight percent acrylic acid.

More specifically, the following enumerated ingredients were added to a 5 liter round bottom flask equipped with an air driven stirrer: (1) deionized water, 158.5 grams, (2) 100% active sodium dodecyl benzene sulfonate (commercially available from Rhone-Poulenc under the product name SIPONATE® DS-10), 1.6 grams, and (3) sodium bicarbonate, 2 grams. This charge was heated to 80° C. under a blanket of nitrogen.

At 80° C., the following solution was added to the flask: (1) deionized water, 22 grams, (2) ammonium persulfate, 6 grains, and (3) pre-emulsion solution, 68.1. The pre-emulsion solution included: (1) deionized water, 685.7 grains, (2) SIPONATE® DS-10, 6.4 grams, (3) methyl methacrylate, 640 grams, (4) ethyl hexyl acrylate, 528 grams, (5) styrene, 400 grains, and (6) acrylic acid, 32 grains. Once the addition of these components was complete, the reaction was held at 80° C. for 15 minutes to form a seeded polymerization. Thereafter, while the temperature of the flask was maintained from between 80° C. to 85° C., the remaining pre-emulsion solution was added to the flask over a 3 hour period of time.

Upon completion of the pre-emulsion feed, the reaction was maintained at a temperature range from between 80° C. to 85° C. for two additional hours. The reaction was then cooled to 35° C. and neutralized to a pH of about 9 with the addition of 32 grains of concentrated ammonium hydroxide. The resulting latex had a non-volatile content of about 41%, a pH of about 9 and a particle size of about 850 Å.

EXAMPLE II

This example demonstrates the preparation of a low V.O.C. primer. This primer was prepared from the components in TABLE 1:

TABLE 1

| | |
|---|---|
| Urethane dispersion[1] | 487.0 |
| Acrylic Latex[2] | 324.0 |
| ACRYSOL RM 8[3] | 1.9 |
| Butyl carbitol | 3.9 |
| SURFONYL 104A[4] | 9.0 |

TABLE 1-continued

| | |
|---|---|
| Deionized water | 30.4 |
| | 856.2 |
| Aziridine[5] | 18.3 |

[1]CYDROTHANE RP-1035
[2]Prepared in accordance with Example I
[3]Rheology modifier commercially available from Rohm & Haas
[4]Surfactant commercially available from Union Carbide.
[5]Crosslinker CX-100 commercially available form Zeneca Resins The V.O.C. of the primer composition prepared in accordance with this example was about 0.4.

EXAMPLE III

This example demonstrates the preparation of a low V.O.C. primer. This primer was prepared from the components in TABLE 2:

TABLE 2

| | |
|---|---|
| Urethane dispersion[1] | 320.4 |
| Acrylic Latex[2] | 482.3 |
| ACRYSOL RM 8 | 1.9 |
| BUTYL CARBITOL | 3.9 |
| SURFONYL 104A | 9.0 |
| Deionized water | 30.4 |
| | 847.9 |
| Aziridine | 19.1 |

[1]CYDROTHANE HP-1035
[2]Prepared in accordance with Example I
[3]2-(2-butoxy ethoxy) ethanol commercially available from Union Carbide The V.O.C. of the primer composition prepared in accordance with this example was about 0.4.

EXAMPLE IV

This example demonstrates the preparation of low V.O.C. primers encompassed by the present invention. These primers were prepared from the components in TABLE 3:

TABLE 3

| | | |
|---|---|---|
| Urethane dispersion[1] | 174.5 | 174.5 |
| Acrylic Latex[2] | 576.3 | 576.3 |
| ACRYSOL RM 8 | 1.3 | 1.3 |
| BUTYL CARBITOL | 2.6 | 27.6 |
| SURFONYL 104A | 8.9 | 8.9 |
| Deionized water | 30.5 | 30.5 |
| | 794.1 | 819.1 |
| Aziridine | 19.3 | 19.3 |
| Coalescence: | Poor | Good |
| V.O.C. Level: | 0.5 lb./gal | 1.0 lb./gal |

[1]CYDROTHANE HP-1035
[2]Prepared in accordance with Example 1

As seen above, when only about 20% solvent-free urethane dispersion was employed, additional solvent (i.e., about 25 lbs/100 gallons of butyl carbitol) was necessary to promote coalescence.

EXAMPLE V

This example demonstrates the preparation of white primers which contain the combination of a solvent-free urethane dispersion and an acrylic latex. The following formula is broken down into paste and liquid sections.

TABLE 4

Paste Portion

| | |
|---|---|
| Deionized water | 65.3 |
| ACRYSOL I98 | 63.7 |
| Dimethylethanol amine | 2.9 |
| Butyl carbitol | 5.5 |
| DEE-FO 806[1] | 5.8 |
| SURFONYL 104A | 3.9 |
| Titanium dioxide | 259.0 |
| AEROSIL 200[2] | 5.0 |
| | 411.1 |
| Water washout: | 22.0 |
| TOTAL PASTE: | 433.1 |

Liquid Portion

| | |
|---|---|
| Urethane dispersion[3] | 231–347(40–60%) |
| Acrylic Latex[4] | 347–231(60–40%) |
| Deionized water | 29.6 |
| BUTYL CARBITOL | 3.3 |
| ACRYSOL RM 8 | 6.6 |
| | 617.5 |
| TOTAL COATING: | 1050.6 |

[1]Defoaming agent commercially available from Ultra Additives
[2]Rheology modifier commercially available from Cabot Corp.
[3]CYDROTHANE HP-1035
[4]Prepared in accordance with Example I

EXAMPLE VI

This example demonstrates the production of a polyol which was used in the preparation of urethane topcoat compositions.

Part 1

This example illustrates high solids compositions comprising a polyester-urethane polyol, and the method of preparing same. First, a polyester-polyol composition was prepared, as follows:

| Ingredients | Parts by Weight (grams) |
|---|---|
| Hexahydrophthalic anhydride | 7165.2 |
| 1,6-Hexanediol | 5493 |
| Neopentyl glycol | 4841.6 |

The above ingredients were charged to a properly equipped reaction vessel and the resultant mixture was then heated to react in a nitrogen atmosphere. At 170° C. (338° F.), there resulted the production of water of (esterification) reaction. With the continuous removal of the water, heating was continued to 200° C. (392° F.). The reaction mixture was then held at 200° C. (392° F.) for about 9 hours until an acid value of about 9.5 was attained. The resultant mixture was then cooled to a temperature of about 70° C. (158° F.), discharged and analyzed.

Theoretical solids content was 100 percent, viscosity was 95.6 stokes, acid value was 9.5 and hydroxyl value was 319.5.

Part 2

A polyester-urethane polyol was prepared with the above polyester-polyol composition, as follows:

| Ingredients | Parts by Weight (grams) |
|---|---|
| The polyester-polyol (as described above) | 8100 |
| Trimethyl hexamethylene diisocyanate | 1429 |
| Dibutyltin dilaurate | 0.95 |
| Methylisobutyl ketone | 1058 |

The above ingredients were charged to a properly equipped reaction vessel and the resultant mixture heated to react in a nitrogen atmosphere to a temperature of 110° C. (230° F.). The reaction mixture was held at this temperature for about 2 ½ hours until all the isocyanate had reacted. The resultant composition was discharged and analyzed.

Theoretical solids content was 90 percent, acid value was 7.9 and hydroxyl value was 180.2.

EXAMPLE VII

This example demonstrates the production of two different urethane topcoats. The first of these topcoats had an isocyanate index of about 1.3. This particular topcoat was prepared from the components of TABLE 5.

TABLE 5

Polyol Component

| | |
|---|---|
| Methyl isobutyl ketone | 236.0 |
| PM Acetate[1] | 189.0 |
| Uvitex OB[2] | 2.2 |
| Cellulose acetate butyrate | 10.1 |
| TINUVIN 328[3] | 9.4 |
| TINUVIN 292[3] | 4.1 |
| Polyol[4] | 324.0 |
| | 775.4 |

Isocyanate Component

| | |
|---|---|
| DESMODUR N-755 | 310.0 |

[1]Methyl ether propylene glycol acetate available from Dow Chemical Company.
[2]2,2'-(2,5-thiophenediyl)bis(5-tert-butylbenzoxanole) optical brightener available from Ciba Geigy
[3]Ultraviolet light absorbers
[4]Polyol prepared in accordance with Example 6, part 2
[5]Polyisocyanate commercially available from BAYER USA A first set of golf balls was coated with a high V.O.C. waterborne polyurethane/acrylic based primer. The golf balls' covers were made of Suryln® resin. The primer had a V.O.C. of about 2.8. Thereafter, the primed golf balls were coated with the first urethane topcoat prepared in accordance with this example. These coated golf balls are hereinafter referred to as "Control Balls."

The second of these urethane topcoats had an isocyanate index of about 1.7. This particular topcoat was prepared from the components of TABLE 6.

TABLE 6

Polyol Component

| | |
|---|---|
| Methyl isobutyl ketone | 228.0 |
| PM Acetate | 183.0 |
| Uvitex OB | 1.9 |
| Cellulose acetate butyrate | 17.3 |
| TINUVIN 328 | 8.1 |
| TINUVIN 292 | 4.0 |
| Polyol[1] | 278.0 |
| Polysiloxane polyether copolymer[2] | 4.3 |
| Polypropylene glycol[3] | 64.0 |

TABLE 6-continued

| Isocyanate Component | |
|---|---|
| | 788.6 |
| DESMODUR N-75 | 386.0 |

[1]Polyol prepared in accordance with Example 6, part 2
[2]Hydroxy-functional linear polyether-modified polysiloxane copolymer available from Goldschmidt Chemical Corp. under the product name of TEGO Glide 440
[3]Commercially available from PPG-Mazur under the product name of ARCOL PPG-425 (eq. wt. 425)

A second set of golf balls was coated with a low V.O.C. waterborne polyurethane/acrylic based primer. The golf balls' covers were made of Suryln® resin. The primer was that which was prepared in accordance with Example 11. Thereafter, the primed golf balls were coated with the second urethane topcoat prepared in accordance with this example. These coated golf balls are hereinafter referred to as "New System Balls."

The Control and New System balls were then tested for adhesion and durability. The results were as follows:

Adhesion: ASTM 441, adhesion for both New System and Control Balls was 100%.
QUV Test (1000 hrs): ASTM D 4587, no difference between New System and Control Balls; also, slight yellowing with no loss of adhesion for both.
Hit Testing: After 200 hits, no difference between New System and Control Balls.
Cold Cracking: No difference between New System and Control Balls.
Water Immersion: After 24 hours, no difference between New System and Control Balls.
Tumble Test: New System Balls showed significantly less ink loss when compared to Control Balls.

In addition to the above tests, the New System and Control Balls were subjected to actual trail use on a driving range in Carlsbad, Calif. for one month. The results were as follows:

Control Balls: Excessive ink loss
New System Balls: No, to slight, ink loss.

EXAMPLE VIII

This example demonstrates the coating of golf balls with a low V.O.C. primer and a urethane topcoat. The golf balls' covers were made of Suryln® & resin. The primer was that which was prepared in accordance with Example II; and the urethane topcoat was that prepared in accordance with the first urethane topcoat of Example VII.

The coated golf balls were subjected to a Tumble Test. The results were as follows: The golf balls had poor ink durability when compared to the results of the coated golf balls in Example IX.

EXAMPLE IX

This example demonstrates the coating of golf balls with a low V.O.C. primer and a urethane topcoat. The golf balls' covers were made of Suryln® resin. The primer was that which was prepared in accordance with Example II; and the urethane topcoat had an isocyanate index of about 1.3. This particular topcoat was prepared from the components of TABLE 7.

TABLE 7

| Polyol Component | |
|---|---|
| Methyl isobutly ketone | 236.0 |
| PM Acetate | 189.0 |
| Uvitex OB | 2.2 |
| Cellulose acetate butyrate | 10.1 |
| TINUVIN 328 | 9.4 |
| TINUVIN 292 | 4.1 |
| Polyol[1] | 324.0 |
| Polysiloxane polyether copolymer[2] | 4.3 |
| | 779.7 |
| Isocyanate Component | |
| DESMODUR N-75 | 310.0 |

[1]Polyol prepared in accordance with Example 6, part 2
[2]Hydroxy-functional linear polyether-modified polysiloxane copolymer available from Goldschmidt Chemical Corp. under the product name of TEGO Glide 440

The coated golf balls were subjected to a Tumble Test. The results were as follows: The golf balls had very good ink durability, especially when compared to the results of the coated golf balls in Example VIII.

EXAMPLE X

This example demonstrates the coating of golf balls with a low V.O.C. primer and a urethane topcoat. The golf balls' covers were made of Suryln® resin. The primer was that which was prepared in accordance with Example II; and the urethane topcoat had an isocyanate index of about 1.3. This particular topcoat was prepared from the components of TABLE 8.

TABLE 8

| Polyol Component | |
|---|---|
| Methyl isobutly ketone | 228.0 |
| PM Acetate | 183.0 |
| Uvitex OB | 1.9 |
| Cellulose acetate butyrate | 17.3 |
| TINUVIN 328 | 8.1 |
| TINUVIN 292 | 4.0 |
| Polyol[1] | 278.0 |
| Polysiloxane polyether copolymer[2] | 4.3 |
| Polypropylene glycol[3] | 64.0 |
| | 788.6 |
| Isocyanate Component | |
| DESMODUR N-75 | 295.0 |

[1]Polyol prepared in accordance with Example 6, part 2
[2]Hydroxy-functional linear polyether-modified polysiloxane copolymer available from Goldschmidt Chemical Corp. under the product name of TEGO Glide 440
[3]Commercially available from PPG-Mazur under the product name of ARCOL PPG-425 (eq. wt. 425)

The coated golf balls were subjected to a Tumble Test. The results were as follows: The golf balls had excellent ink durability, especially when compared to the results of the coated golf balls in Examples VIII and IX.

EXAMPLE XI

This example demonstrates the preparation of a urethane topcoat which relatively fast at relatively low temperatures. A first urethane topcoat had an isocyanate index of about 1.7. This particular topcoat was prepared from the components of TABLE 9.

TABLE 9

| Polyol Component | |
| --- | --- |
| Methyl isobutly ketone | 228.0 |
| PM Acetate | 183.0 |
| Uvitex OB | 1.9 |
| Cellulose acetate butyrate | 17.3 |
| TINUVIN 328 | 8.1 |
| TINUVIN 292 | 4.0 |
| Polyol[1] | 278.0 |
| Polysiloxane polyether copolymer[2] | 4.3 |
| Polypropylene glycol[3] | 64.0 |
| Dibutyl tin dilaurate | 5.0 |
| | 793.6 |
| Isocyanate Component | |
| DESMODUR N-75 | 386.0 |

[1] Polyol prepared in accordance with Example 6, part 2
[2] Hydroxy-functional linear polyether-modified polysiloxane copolymer available from Goldschmidt Chemical Corp. under the product name of TEGO Glide 440
[3] Commercially available ftom PPG-Mazur under the product name of ARCOL PPG-425 (eq. wt. 425)

A first set of golf balls was coated with the low V.O.C. primer prepared in accordance with Example II. The golf balls' covers were made of Suryln® resin. Thereafter, the primed golf balls were coated with the first urethane topcoat prepared in accordance with this example. These coated golf balls are hereinafter referred to as "New System Balls."

A second urethane topcoat was then prepared from the same components as set out in TABLE 9 except that the second topcoat did not contain any dibutyl tin dilaurate.

A second set of golf balls was then coated with the low V.O.C. primer prepared in accordance with Example II. The golf balls' covers were made of Suryln® resin. Thereafter, the primed golf balls were coated with the second urethane topcoat prepared in accordance with this example. These coated golf balls are hereinafter referred to as "Control Balls."

The New System Balls were heated to a temperature of 50° C. until the balls were no longer tacky to the touch. This curing process took approximately 1 hour. The Control Balls were then subjected to the same curing temperature and conditions. This latter curing process took approximately 14 hours.

It is evident from the foregoing that various modifications, which are apparent to those skilled in the art, can be made to the embodiments of this invention without departing from the spirit or scope thereof. Having thus described the invention, it is claimed as follows.

That which is claimed is:

1. A water-based primer composition having a volatile organic content of less than 1.5 comprising:
   (a) an aqueous dispersion of a urethane component, said urethane component having a tensile strength ranging from about 4,000 to about 9,000 p.s.i. and a glass transition temperature ranging from about 20° C. to about 50° C., and being present in primer composition in an amount ranging from 0 to about 90 weight percent, and
   (b) an aqueous dispersion of an acrylic resin component having a glass transition temperature ranging from about 10° C. to about 90° C., and being present in the primer composition in an amount ranging from about 90 to about 10 weight percent, wherein each of the aqueous dispersion of the urethane component and the aqueous dispersion of the acrylic resin component contains no more than about 15 weight percent organic solvent.

2. The water-based primer composition as recited in claim 1 having a volatile organic content of less than about 1.3.

3. The water-based primer composition as recited in claim 1 having a volatile organic content of less than about 1.1.

4. The water-based primer composition as recited in claim 1 wherein the urethane component has a tensile strength ranging from between about 5,000 to about 8,000 p.s.i.

5. The water-based primer composition as recited in claim 1 wherein the urethane component has a tensile strength ranging from between about 6,000 to about 7,000 p.s.i.

6. The water-based primer composition as recited in claim 1 wherein the urethane component has a glass transition temperature ranging from between about 25° C. to about 45° C.

7. The water-based primer composition as recited in claim 1 wherein the urethane component has a glass transition temperature ranging from between about 30° C. to about 40° C.

8. The water-based primer composition as recited in claim 1 wherein the urethane component comprises a trimethylxylene diisocyanate polyester polymer.

9. The water-based primer composition as recited in claim 1 wherein the acrylic resin component has a glass transition temperature ranging from between about 15° C. to about 70° C.

10. The water-based primer composition as recited in claim 1 wherein the acrylic resin component has a glass transition temperature ranging from between about 20° C. to about 50° C.

11. The water-based primer composition as recited in claim 1 wherein the ratio of the urethane component to the acrylic resin component ranges from between about 20:80 to about 80:20.

12. The water-based primer composition as recited in claim 1 wherein the ratio of the urethane component to the acrylic resin component ranges from between about 30:70 to about 70:30.

13. The water-based primer composition as recited in claim 1 wherein the acrylic resin component further comprises an adhesion promoter.

14. A golf ball comprising:
   (a) a core,
   (b) a cover, and
   (c) a coating over said cover, said coating comprising a water-based primer composition having a volatile organic content of less than about 1.5, said primer composition comprising:
      (i) an aqueous dispersion of a urethane component, said urethane component having a tensile strength ranging from about 4,000 to about 9,000 p.s.i. and a glass transition temperature ranging from about 20° C. to about 50° C., and being present in primer composition in and amount ranging from 0 to about 90 weight percent, and
      (ii) an aqueous dispersion of an acrylic resin component having a glass transition temperature ranging from about 10° C to about 90° C, and being present in the primer composition in an amount ranging from about 90 to about 10 weight percent
   wherein each of the aqueous dispersion of the urethane component and the aqueous dispersion of the acrylic resin component contains no more than about 15 weight percent organic solvent.

15. A golf ball as recited in claim 14 wherein the cover is made from a material selected from the group consisting of: ionomeric resin, balata, synthetic balata, polyethylene, polypropylene and polyurethane.

16. A golf ball as recited in claim 14 wherein a topcoat is applied over the primer composition.

17. The primer composition of claim 1, wherein at least one of the aqueous dispersion of the urethane component and the aqueous dispersion of the acrylic resin component has an organic solvent content of less than about 5 weight percent.

18. The primer composition of claim 1, wherein at least one of the aqueous dispersion of the urethane component or the aqueous dispersion of the acrylic resin component has an organic solvent content of less than about 2 weight percent.

19. The golf ball according to claim 14, wherein at least one of the aqueous dispersion of the urethane component and the aqueous dispersion of the acrylic resin component has an organic solvent content of less than about 5 weight percent.

20. The golf ball according to claim 14, wherein at least one of the aqueous dispersion of the urethane component and the aqueous dispersion of the acrylic resin component has an organic solvent content of less than about 2 weight percent.

* * * * *